(12) United States Patent
Hoefelmeyer et al.

(10) Patent No.: US 8,769,687 B2
(45) Date of Patent: Jul. 1, 2014

(54) NETWORK SECURITY ARCHITECTURE

(75) Inventors: Ralph Samuel Hoefelmeyer, Colorado Springs, CO (US); Theresa Eileen Phillips, Fairfax, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 91 days.

(21) Appl. No.: 13/196,798

(22) Filed: Aug. 2, 2011

(65) Prior Publication Data

US 2012/0005756 A1     Jan. 5, 2012

Related U.S. Application Data

(63) Continuation of application No. 10/024,202, filed on Dec. 21, 2001, now abandoned, which is a continuation-in-part of application No. 09/911,592, filed on Jul. 24, 2001, now abandoned.

(51) Int. Cl.
    *H04L 29/06*     (2006.01)

(52) U.S. Cl.
    USPC ............................................ 726/23

(58) Field of Classification Search
    USPC ............................. 726/22–24; 713/187, 188
    See application file for complete search history.

(56) References Cited

U.S. PATENT DOCUMENTS

| | | | |
|---|---|---|---|
| 5,889,943 A * | 3/1999 | Ji et al. | 726/22 |
| 5,960,170 A * | 9/1999 | Chen et al. | 714/38.14 |
| 6,789,202 B1 * | 9/2004 | Ko et al. | 726/23 |
| 7,461,402 B1 * | 12/2008 | Lyle et al. | 726/22 |
| 2001/0052014 A1 * | 12/2001 | Sheymov et al. | 709/225 |
| 2002/0129277 A1 * | 9/2002 | Caccavale | 713/201 |
| 2002/0133717 A1 * | 9/2002 | Ciongoli et al. | 713/201 |

\* cited by examiner

*Primary Examiner* — Ali Abyaneh (57) ABSTRACT

A network security system is deployed between an internet backbone and intranets that belong to subscribing organizations. The system includes a scanning system that scans incoming electronic mail for malicious code and an anti-virus server for downloading anti-virus code to clients on the intranets. A switch is provided for directing incoming electronic mail from the internet backbone to the scanning system so that the electronic mail can be scanned. In one embodiment, a decoy server is also provided for masquerading as a legitimate server and logging suspicious activity from communications received from the internet backbone.

20 Claims, 5 Drawing Sheets

NETWORK SECURITY ARCHITECTURE

RELATED APPLICATIONS

The present application is a continuation of U.S. patent application Ser. No. 10/024,202 filed on Dec. 21, 2001 which is a continuation-in-part of U.S. patent application Ser. No. 09/911,592 filed on Jul. 23, 2001, the contents of which are hereby incorporated by reference.

FIELD OF THE INVENTION

The present invention relates to computer security and more particularly to a network security architecture.

BACKGROUND OF THE INVENTION

With the explosion of global, computer communications spurred by the Internet, on-line organizations' need for protection against cyber-criminals and cyber-vandals has also been expanding. For example, data and network sabotage incidents continue to increase—by over 35% per year from 1997 to 1999. Financial fraud perpetrated on-line has increased 25% in the same period. Viruses, worms, Trojan horses and other malicious code continue to plague enterprise and home users, and many are global in scope, such as the infamous "love bug" worm of 2000. Warfare has even gone on-line, with cyber-terrorists in hot spots such as the Balkans and the Middle East making attacks on web sites and servers, and as the avowed tool of nation-states, notably the United States of America and the People's Republic of China. Mainstream press coverage of these events has heightened privacy and security concerns, hindering the widespread adoption of Internet commerce.

Accordingly, organizations need network security to protect organizations from malicious attacks over the Internet, whether by hackers or from viruses. In fact, the market for network security is expanding rapidly, reaching a projected value of $10 billion by the end of the year 2001. Unfortunately, most network security approaches are ad-hoc and implemented on an organization-by-organization basis. These approaches not only tend to be staff-intensive and expensive, but they also quickly become out-of-date, falling behind the malicious technology that is constantly being developed by hackers. As a result, there is an urgent need for a scalable, network security architecture that can take advantage of economies of scale and simplify the provisioning of network security services to organizations.

SUMMARY OF THE INVENTION

This present invention addresses this and other needs by providing a scalable, layered, network, system and application security architecture that comprises a combination of server-based and client-based malicious code scanning components in conjunction with a firewall for diverting suspect traffic to decoy servers, and an overall security management system for attack correlation across the enterprise or network infrastructure. This security architecture can be deployed between the organization's intranet and internet backbone and can be shared between various organizations, thereby providing the economies of scale that conventional network security solutions lack.

Accordingly, one aspect of the present invention pertains to a network security system to be deployed between intranets that belong to subscribing organizations and an internet backbone. The server-based component is a scanning system that scans incoming electronic mail for malicious code. The client-based component is a malicious code detection FTP software server for downloading anti-virus code to clients on the intranets. A switch is provided for directing incoming electronic mail from the internet backbone to the scanning system so that the electronic mail can be scanned. In addition to the switch, a Denial of Service (DoS) or Distributed DOS scanning/filtering switch may be employed to prevent these specific attacks. In one embodiment, a decoy server is also provided for masquerading as a legitimate server and logging suspicious activity from communications received from the internet backbone.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for network security are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Network Security Architectural Overview

Figure 1:
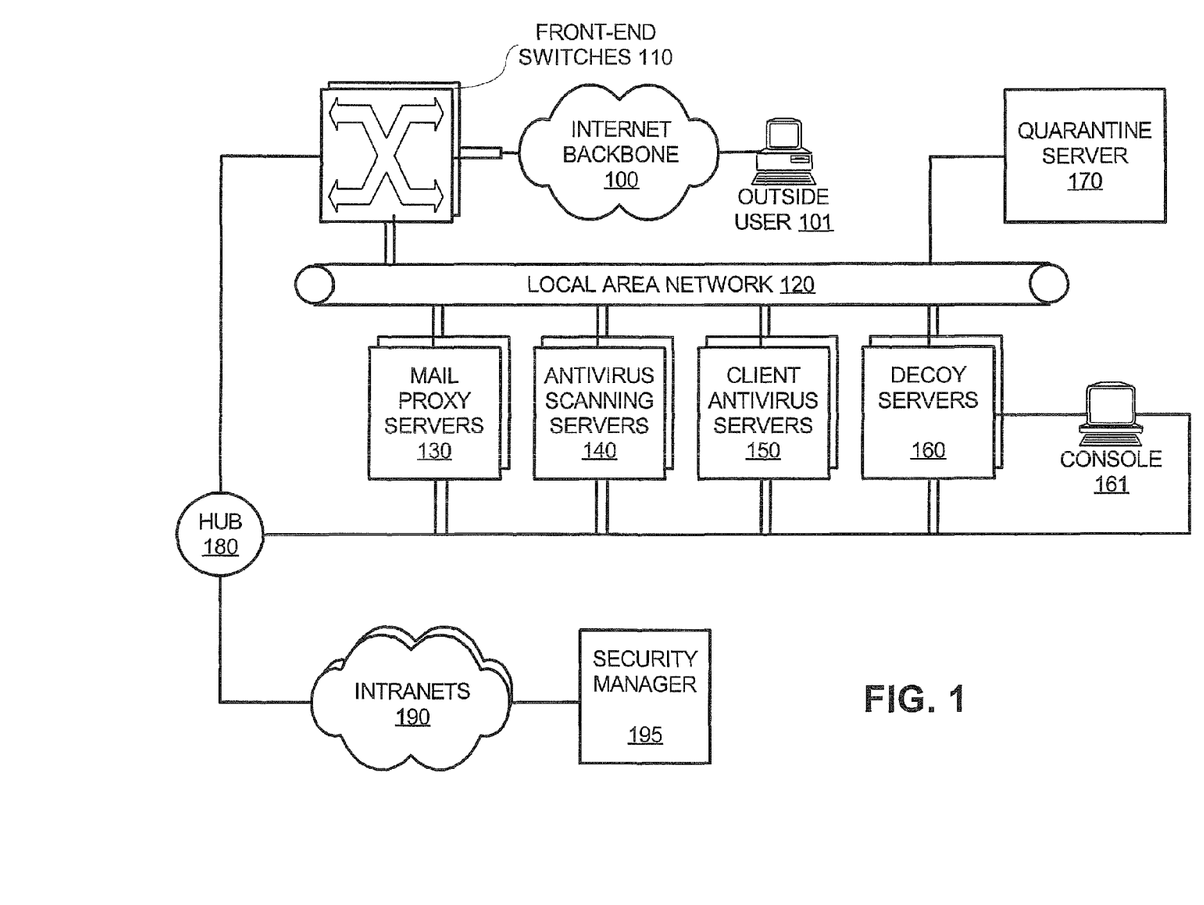
FIG. 1 is a block diagram of a network security architecture in accordance with one embodiment of the present invention.

FIG. 1 is a block diagram of an exemplary network security architecture for combating viruses, malicious code, and other possible forms of attack from an outside user 101 via the Internet. As described in greater detail below, this architecture employs a scalable, multi-layered approach that has both server-side and client-side components for antiviral defense, as well as the provision of firewalls for handling intruders. In a preferred embodiment, resilience is achieved by featuring multiple servers for redundancy. This architecture is also designed to be used by third parties under subscription, simply by turning on the third party's customer domain in the network.

In the architecture illustrated in FIG. 1, one or more front-end switches 110 are coupled to the Internet backbone 100 and provide the basic gate-keeping functionality of the architectures. In one implementation, the front-end switches 110 also measure and record the communications traffic between the customers' systems and the Internet for billing purposes. The front-end switches 110, which may be implemented with one or more CISCO™ 6509 switches, are thus responsible for receiving communications from the Internet backbone 110, directing the Internet communication to an appropriate security server for detecting and responding to incoming threats, and load balancing among the security servers. Accordingly, the front-end switches 110 are positioned to intercept incoming electronic mail and other communications before they are routed to the customers' systems. The switches are also connected directly to DoS/DdoS scanning/filtering switches operating at line speed.

A local area network 120, such as a fast ETHERNET™ network, couples the front-end switches 110 with the security servers, which comprise, for example, one or more mail proxy servers 130, one or more antivirus scanning servers 140, one or more client antivirus servers 150, one or more decoy servers 160, and a quarantine server 170. The front-end switches 110, the mail proxy servers 130, the antivirus scanning servers 140, the client antivirus servers 150, and the decoy servers 160 are in communication with a hub 180, which communicates with client intranets 190 that belong to respective customers.

Each of the security servers may have a console that is connected to it, to allow an operator to perform administrative and other tasks on the corresponding server. For example, as illustrated in FIG. 1, a console 161 is provided to allow the operator to access and perform administrative tasks on one of the decoy servers 160.

In one embodiment, devices are configured to report events to an overall security manager 195, e.g., HP OpenView™ or eSecurity's Management system, for correlation of the security events across the network, system and application layers. Furthermore, policy rules for enabling customization of the system functions are kept in a policy server, which keeps the policy rules in a policy database tied into the profile management system. The profile management system may also be used for service authorization. The security manager 195 is preferably installed on a server on a separate subnet, such as a Security Operations Center (not shown), which monitors the local area network 120 and receives alarms from the servers located in the local area network 120, or on the intranet 190 at a security administrator's desktop.

Antivirus Scanning

Figure 2:
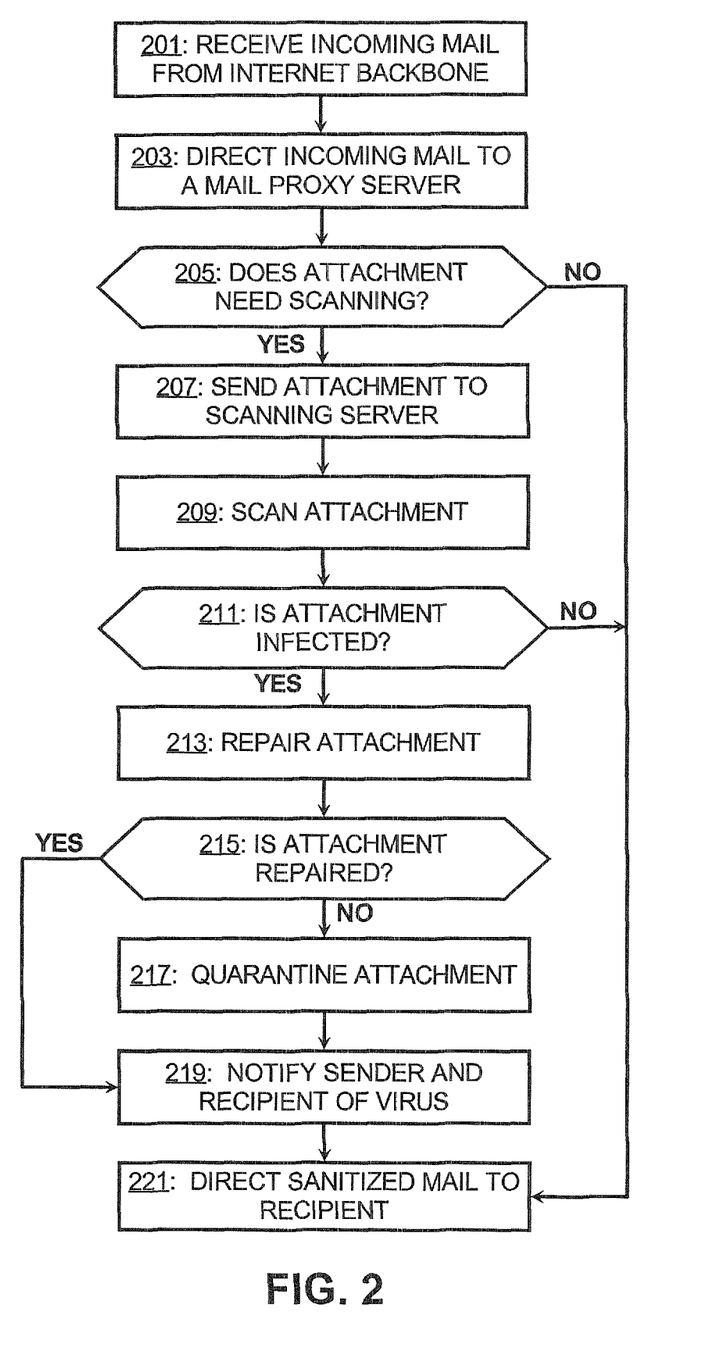
FIG. 2 is a flowchart that illustrates an anti-virus scanning aspect of one embodiment of the present invention.

One aspect of the present invention relates to a server-side antivirus deployment to protect client intranets 190 from incoming viruses and other kinds of malicious code. Referring to FIG. 2, incoming electronic mail is received by the front-end switches 110 from the Internet backbone 100 (step 201). This electronic mail may contain viruses that have been attached innocently or deliberately by the outside user 101, or may be embedded in the body of the e-mail itself, e.g., as an HTML bug or Java script.

At step 203, the front-end switches 110 direct the incoming electronic mail and any other messages received on the SMTP port over the local area network 120 to one of the mail proxy servers 130. Although the following discussion will refer throughout to incoming electronic mail messages by way of a common example, the present invention is not so limited and the principles described herein are applicable to incoming files via FTP, HTTP or other file transfer mechanisms from the Internet backbone 100. In addition to files, data streams or the actual body of a mail message or HTML page may contain scripts which may act maliciously.

The mail proxy server 130, in response at step 205, examines electronic mail messages to determine if the electronic mail messages and/or attachments need to be scanned for viruses. This determination can be done in accordance with a policy, that may be set by the customer or the service provider, to permit setting a proper balance between security and performance. Accordingly, the particular policy may vary from implementation to implementation and, indeed, from one installation to another. For example, the policy can state that all executable attachments should be scanned for viruses. The policy can also state that all documents with embedded macros should be scanned for viruses. In fact, one policy can specify that all electronic mail messages are to be scanned for viruses. When the mail proxy server 130 determines, in accordance with the policy, that the electronic mail message needs to be scanned, the mail proxy server 130 sends the electronic mail message to one or more of the antivirus scanning servers 140 for that operation (step 207). The mail proxy also verifies that either the sender or receiver of the message is an authorized user of this service. This may be accomplished by any of several well known authentication methods, one example of which would be the use of a user id and password credential stored in a profile management system.

When the electronic mail message is received by one or more of the antivirus scanning servers 140, the electronic mail message is scanned for malicious code (step 209). In one implementation, antivirus scanning software on the one or more of the antivirus scanning servers 140 employs a catalog of viral signatures, which are often simple strings of bytes that are expected to be found in every instance of a particular virus. Usually, different viruses have different signatures, and the antivirus scanning software use signatures to locate specific viruses. To improve coverage, antivirus scanning software from multiple vendors may be employed, and the scanning may be performed on respective antivirus scanning servers 140 for improved performance as described in the co-pending, commonly assigned patent application Ser. No. 09/862,851 entitled "System and Method for Malicious Code Detection" filed on May 22, 2001 by Hoefelmeyer and Phillips, now U.S. Pat. No. 7,043,757, the contents of which are hereby incorporated by reference in their entirety.

If the electronic mail message is infected, tested at step 211, then the antivirus scanning server 140 may attempt to repair the infected portion of the electronic mail message, e.g. an attachment (step 213), as determined by policy. If the electronic mail message or its attachment cannot be repaired (tested at step 215), then the electronic mail message is quarantined (step 217) by transferring the original, infected electronic mail message to the quarantine server 170 and by removing the infected portion from the electronic mail message to create a sanitized electronic mail message; this action may be varied by policy. The infected electronic mail message can be analyzed at the quarantine server 170 to study the virus, e.g. to generate a new viral signature or determine a new way to sanitize or repair a file infected with the virus.

In either case, when the electronic mail message is infected, the sender and recipient of the electronic mail message may be notified of the detection of the viral infection (step 219), as determined by policy. This notification may be performed by appending text explaining the viral infection to the body of the electronic mail message or as a new attachment or even by composing and sending a new electronic mail message to the sender and recipient of the infected electronic mail message.

When the electronic mail message has been sanitized, by passing the antiviral scan (step 209), being repaired (step 213), or being quarantined (step 217), the sanitized electronic mail message is directed to the recipient, via hub 180 and the appropriate intranet 190. Accordingly, a scalable, resilient server-side antivirus scanning architecture is described, in which preferably multiple mail proxy servers 130 and antivirus scanning servers 140 are deployed to catch and sanitize incoming electronic mail messages. When malicious code is detected, an event is generated to the security management system.

Client-Side Antivirus Distribution

Another aspect of the present invention pertains to distribution of client-side antivirus or other security software. Not all malicious code enters a company's computer network via incoming electronic mail messages or other kinds of files transferred from the Internet via a file transfer protocol. For example, malicious code may be transmitted to the company's computers or the company's intranet via files that are borne on portable computer-readable media, such as a floppy disk or CD-ROM, and inserted into one of the company's computers. As another example, the incoming electronic mail message or transferred file is encrypted and cannot be scanned before the recipient decrypts the incoming file; or the incoming electronic mail message is retrieved directly from a user's personal mail account, e.g., Yahoo, rather than through the corporate mail server.

In accordance with this aspect of the present invention, a system and method are provided for installing client-side antivirus scanning software on each of the company's computers. The client-side antivirus scanning software is responsible for scanning files that are borne on portable computer-readable medium or locally decrypted to determine whether the files are safe or need repair and/or quarantining. In conventional systems, it is difficult and staff-power intensive to maintain multiple installation of client-side antivirus scanning software, typically resulting in poor antivirus coverage because new updates to the client-side antivirus scanning software are not applied to the clients' systems. This difficulty is addressed in one embodiment of the present invention by providing a centralized client-side antivirus scanning software source and causing the client systems to automatically and periodically download updates.

Figure 3:
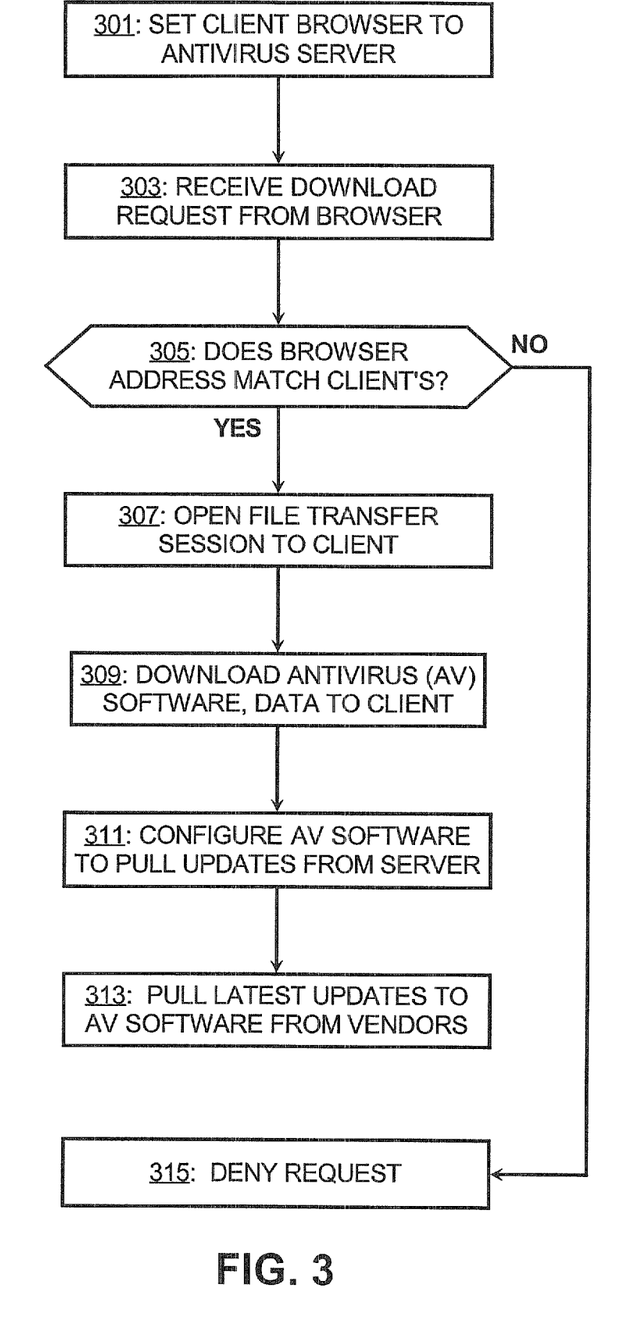
FIG. 3 is a flowchart that illustrates an anti-virus client distribution aspect of one embodiment of the present invention.

FIG. 3 illustrates the operation of one implementation of installing client-side antivirus scanning software. At step 301, an operator at one of the client's computers directs a browser to a location on one of the client antivirus servers 150, e.g. by typing the URL (Uniform Resource Locator) of a web page for downloading the client-side antivirus scanning software. In response, a web page is displayed at the client's browser and the operator performs an action (such as clicking on a button or pressing the return key) to initiate the installation.

At step 303, the installation request is received by the client antivirus server 150 from the browser. In response, the client antivirus server 150 checks the network address of the browser with a list of the subscribing clients' network addresses (step 305). If the network address of the browser does not match the list of subscribing clients' network addresses, then the request is denied (step 315), thereby denying use of this system for non-subscribers. Alternatively, authorization to download the client-side antivirus scanning software can be controlled through passwords, public keys, or other forms of authentication, e.g., a wireless phone's Subscriber Identity Module (SIM), all of which may be stored in the profile management system.

If, on the other hand, the network address of the browser does indeed match the list of subscribing clients' network addresses, then execution proceeds to step 307 where the client antivirus server 150 opens a file transfer session to the client's computer. At step 309, the client-side antivirus scanning software is downloaded to the client's computer along with any data necessary, such as a database of updated viral signatures. The client-side antivirus scanning software is also configured at step 311, during this installation process, to periodically pull updates of the antivirus scanning software and data. To distribute the load for multiple clients' downloading the updates, a randomization function may be used to set a respective update time during an eight-hour window, e.g. between 10 p.m. and 6 a.m. Thus, the automatic updating of the client-side antivirus scanning software and data is evenly distributed throughout this period, rendering the system as a whole more scalable and resilient.

To ensure that the clients' computer systems will have the latest updates of the client-side antivirus scanning software, the client antivirus servers 150 are configured to periodically (e.g. by an entry in a UNIX™ cron table) to pull the latest updates from the vendors of the client-side antivirus scanning software (step 313). Accordingly, a scalable and extensible client-side antivirus scanning system is described, in which a common interface for installing the client-side antivirus scanning software is presented to each of the client's computers and configures the computers to automatically pull down the latest updates to the client-side antivirus scanning software and data on a periodic basis. As a result, the difficulties of conventional, staff-intensive approaches are alleviated.

Decoy Servers

Computer viruses, whether communicated by electronic mail or through portable computer-readable media, are not the only security threats to a computer network. For example, a hacker could use active means, such as using a Telnet connection or the SubSeven Trojan horse, to intrude upon and possibly damage a computer system on the network. Accordingly, one embodiment of the present invention provides intrusion detection, such that intruders are diverted to a decoy environment in which the intruders' actions are monitored, controlled, and contained.

Figure 4:
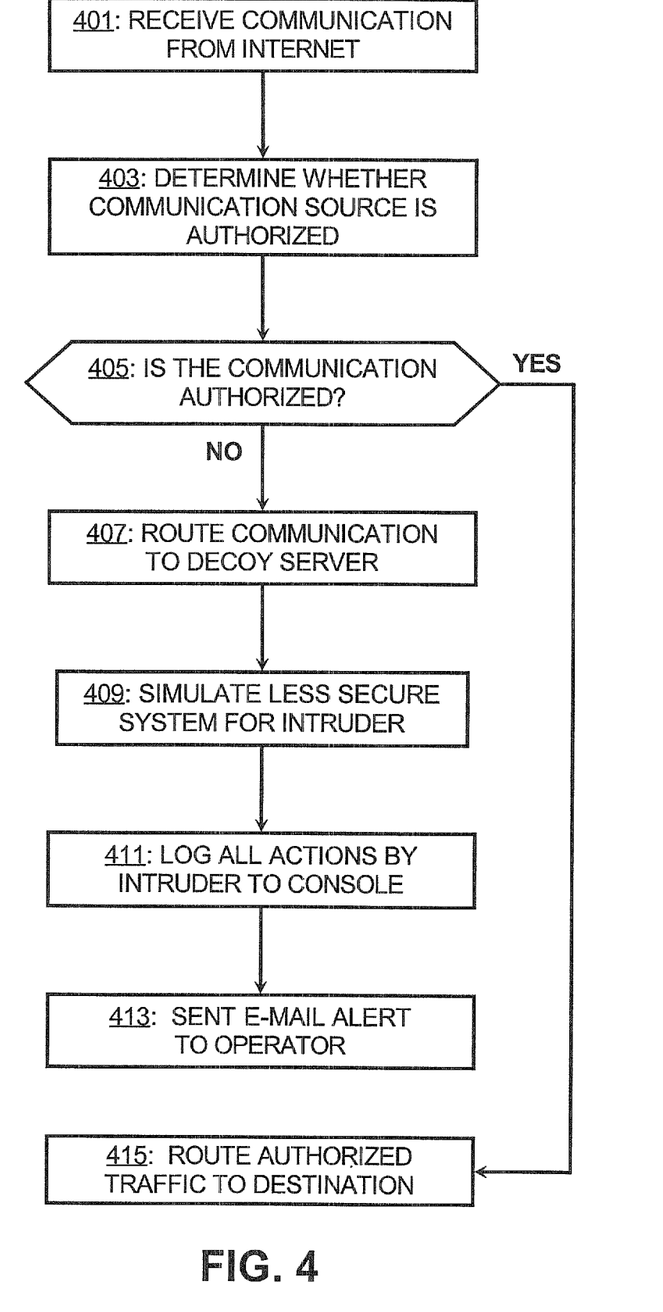
FIG. 4 is a flowchart that illustrates an intrusion decoy aspect of one embodiment of the present invention.

FIG. 4 is a flowchart illustrating the operation of one implementation for intrusion detection in accordance with an embodiment of the present invention. At step 401, the front-end switches 110 received communications from an outside user 101 via the Internet backbone 100. These communications can take a variety of forms and may include, for example, telnet session, pings, and packets sent to any of the IP ports of computers in the intranets 190.

At step 403, the front-end switches 110 determine whether the communication source is authorized to transmit traffic into the intranets 190. Various approaches can be used to make this determination. For example, the front-end switches 110 may maintain a list of known, previously identified threat domains. In this example, all traffic originating from the identified threat domains are tagged as suspicious. In another example, traffic origination from any of suspect domains (also maintained in a list) is considered suspicious. In still another example, any traffic from specific unauthorized IP addresses are deemed suspicious. If the incoming communication uses ports that are not used by any of the applications on the customers' intranets 190, then the incoming communication is flagged as suspicious. If the incoming communication is authorized in the sense of not being determined to be suspicious (tested in step 405), then execution branches to step 415 where the authorized communication is routed to the destination within the intranets.

If, on the other hand, the incoming communication is not authorized (tested in step 405), then execution proceeds to step 407 where the incoming communication is routed to one of one or more decoy servers 160. A decoy server 160 is a computer system that is configured to look like the client's computer system. Thus, when the unauthorized communication is routed to the decoy server 160, the decoy server 160 simulates the client's computer system (step 409). Because the decoy server 160 is separate from the client's computer system, any activity at the decoy server 160 performed by the intruder will not affect the client's computer system. In one embodiment, the decoy server 160 also includes some unpatched operating system/application holes to look more appealing or breakable to a would-be intruder.

When the intruder takes the bait of the decoy server 160, all actions and keystrokes of the intruder are logged to the administration console 161 (step 411). Consequently, the intruder's action can be studied to understand the nature of the intrusion and learn how to counter the intrusion or to ascertain the source of the intrusion. The intruder's actions are logged in sufficient detail to enable investigation and possible prosecution. In addition, an electronic mail alert can be sent from the administration console 161 to an operator to warn that a penetration attempt is underway.

Security Manager

In one embodiment, when individual attacks are detected, events are generated and sent to a security manager 195. The security manager 195 correlates these events across the enterprise to detect multi-pronged and multi-phased attacks, which may come from different network locations and with different methods. The security manager 195 may respond to these detected overall patterns of attack in various appropriate ways, such as automatically deploying additional security safeguards, making a change dictated by policy, or requesting human intervention. The detected nodes of attack vectors can be tracked back across the Internet, either by human methods of forensic analysis, or automatically through use of automated tracking tools, e.g., Recourse Technologies Man-Hunt™ system. Based on policy, counterattacks may be launched, using, for example, industry available attack methods. In addition, logs of all activities may be kept for forensic analysis and/or legal action.

Hardware Overview

Figure 5:
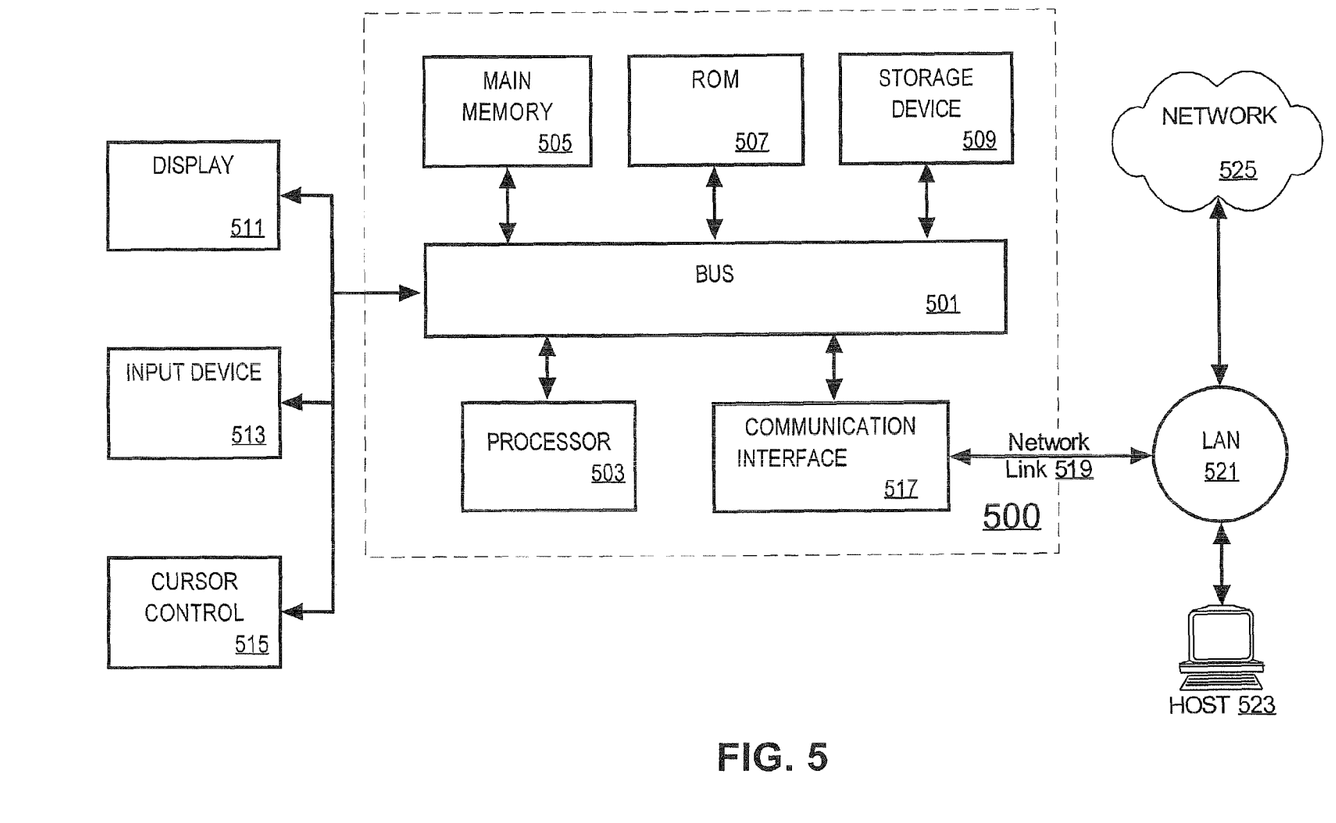
FIG. 5 depicts a computer system that can be used to implement an embodiment of the present invention.

FIG. 5 illustrates a computer system 500 upon which an embodiment according to the present invention can be implemented. The computer system 500 includes a bus 501 or other communication mechanism for communicating information, and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions to be executed by the processor 503. The computer system 500 further includes a read only memory (ROM) 507 or other static storage device coupled to the bus 501 for storing static information and instructions for the processor 503. A storage device 509, such as a magnetic disk or optical disk, is additionally coupled to the bus 501 for storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is cursor control 515, such as a mouse, a trackball, or cursor direction keys for communicating direction information and command selections to the processor 503 and for controlling cursor movement on the display 511.

According to one embodiment of the invention, computer network security is provided by the computer system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, or a telephone modem to provide a data communication connection to a corresponding type of telephone line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by service provider. The local network 521 and network 525 both use electrical, electromagnetic, or optical signals to convey information and instructions. The signals through the various networks and the signals on network link 519 and through communication interface 517, which communicate digital data with computer system 500, are exemplary forms of carrier waves bearing the information and instructions.

The computer system 500 can send messages and receive data, including program code, through the network(s), network link 519, and communication interface 517. In the Internet example, a server (not shown) might transmit requested code belonging to an application program for implementing an embodiment of the present invention through the network 525, local network 521 and communication interface 517.

The processor 503 may execute the transmitted code while being received and/or store the code in storage device 509, or other non-volatile storage for later execution. In this manner, computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as storage device 509. Volatile media include dynamic memory, such as main memory 505. Transmission media include coaxial cables, copper wire and fiber optics, including the wires that comprise bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on a storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method comprising:
    directing incoming electronic mail from an internet backbone network to a scanning system that interfaces between the internet backbone network and one or more intranets associated with different organizations;
    scanning incoming electronic mail associated with the one or more intranets to detect malicious code;
    generating a plurality of events indicating an outcome of the scanning;
    correlating the events across the intranets to detect multi-pronged or multi-phased attacks from different network locations using different methods;
    responding to the detected attacks by initiating a change dictated by policy;
    redirecting suspicious traffic from the internet backbone network to a decoy server that is configured to act as a legitimate server;
    receiving at the decoy server actions of an intruder; and
    logging the actions of the intruder,
    wherein the policy is set by a customer and a determination of whether to scan all incoming electronic mail, to scan only executable attachments to the incoming electronic mail, or to scan only incoming electronic mail containing documents with embedded macros, is selectable by the customer, and sender and recipient of the electronic mail are notified of the detection of a malicious code, as determined by the policy, wherein the notification is performed by at least one of appending text to body of the electronic mail and/or sending a new electronic mail to the sender and recipient.

2. A method according to claim 1, further comprising:
    deploying additional safeguards either to block the malicious code, to trace the malicious code back to an origin, or to launch a counterattack.

3. A method according to claim 1, further comprising:
    transmitting the plurality of events to a security manager.

4. A method according to claim 1, wherein the scanning system is among a plurality of scanning systems, the method further comprising:
    load-balancing among the scanning systems.

5. A method according to claim 1, further comprising:
    determining one of a plurality of viral signatures to be used in the scanning.

6. A method according to claim 1, further comprising:
    selecting one of a plurality of antivirus scanning software to be used in the scanning.

7. A method according to claim 1, further comprising:
    analyzing the electronic mail to examine the malicious code for either generating a new viral signature, determining a new way to sanitize the malicious code, repairing the electronic mail, or a combination thereof.

8. A method according to claim 1, further comprising:
    logging the actions of the intruder to an administrative console.

9. A method according to claim 1, further comprising:
    logging the keystrokes of the intruder.

10. An apparatus comprising:
    at least one processor; and
    at least one memory including computer program code, the memory and the computer program code configured to, with the processor, cause the apparatus to perform at least the following:
        direct incoming electronic mail from an internet backbone network to a scanning system that interfaces between the internet backbone network and one or more intranets associated with different organizations;
        scan incoming electronic mail to detect malicious code;
        generate a plurality of events indicating an outcome of the scanning,
        correlate the events across the intranets to detect multi-pronged or multi-phased attacks from different network locations using different methods;
        respond to the detected attacks by initiating a change dictated by policy;
        redirect suspicious traffic from the internet backbone network to a decoy server that is configured to act as a legitimate server;

receive at the decoy server actions of an intruder; and
log the actions of the intruder,
wherein the policy is set by a customer and a determination of whether to scan all incoming electronic mail, to scan only executable attachments to the incoming electronic mail, or to scan only incoming electronic mail containing documents with embedded macros, is selectable by the customer, and sender and recipient of the electronic mail are notified of the detection of a malicious code, as determined by the policy, wherein the notification is performed by at least one of appending text to body of the electronic mail and/or sending a new electronic mail to the sender and recipient.

11. An apparatus according to claim 10, wherein the apparatus is further caused to:
deploy additional safeguards either to block the malicious code, to trace the malicious code back to an origin, or to launch a counterattack.

12. An apparatus according to claim 10, wherein the apparatus is further caused to:
transmit the plurality of events to a security manager.

13. An apparatus according to claim 10, wherein the scanning system is among a plurality of scanning systems, and the apparatus is further caused to:
load-balance among the scanning systems.

14. An apparatus according to claim 10, wherein the apparatus is further caused to:
determine one of a plurality of viral signatures to be used in the scanning.

15. An apparatus according to claim 10, wherein the apparatus is further caused to:
select one of a plurality of antivirus scanning software to be used in the scanning.

16. An apparatus according to claim 10, wherein the apparatus is further caused to:
analyze the electronic mail to examine the malicious code for either generating a new viral signature, determining a new way to sanitize the malicious code, repairing the electronic mail, or a combination thereof.

17. An apparatus according to claim 10, wherein the actions of the intruder are logged to an administrative console.

18. A system comprising:
a scanning system including at least one processor and at least one memory, the scanning system configured to receive incoming electronic mail from an internet backbone network, wherein the scanning system is further configured to interface between the internet backbone network and one or more intranets associated with different organizations,
wherein the scanning system is further configured to scan incoming electronic mail to detect malicious code, to generate a plurality of events indicating an outcome of the scanning, to correlate the events across the intranets to detect multi-pronged or multi-phased attacks from different network locations using different methods, and to respond to the detected attacks by initiating a change dictated by policy;
and the scanning system is further configured to:
redirect suspicious traffic from the internet backbone network to a decoy server that is configured to act as a legitimate server,
receive at the decoy server actions of an intruder, and
log the actions of the intruder,
wherein the policy is set by a customer and a determination of whether to scan all incoming electronic mail, to scan only executable attachments to the incoming electronic mail, or to scan only incoming electronic mail containing documents with embedded macros, is selectable by the customer, and sender and recipient of the electronic mail are notified of the detection of a malicious code, as determined by the policy, wherein the notification is performed by at least one of appending text to body of the electronic mail and/or sending a new electronic mail to the sender and recipient.

19. A system according to claim 18, wherein the scanning system is further configured to
deploy additional safeguards either to block the malicious code, to trace the malicious code back to an origin, or to launch a counterattack.

20. A system according to claim 18, further comprising:
a security manager configured to receive the plurality of events.

* * * * *